United States Patent Office 3,181,031
Patented Apr. 27, 1965

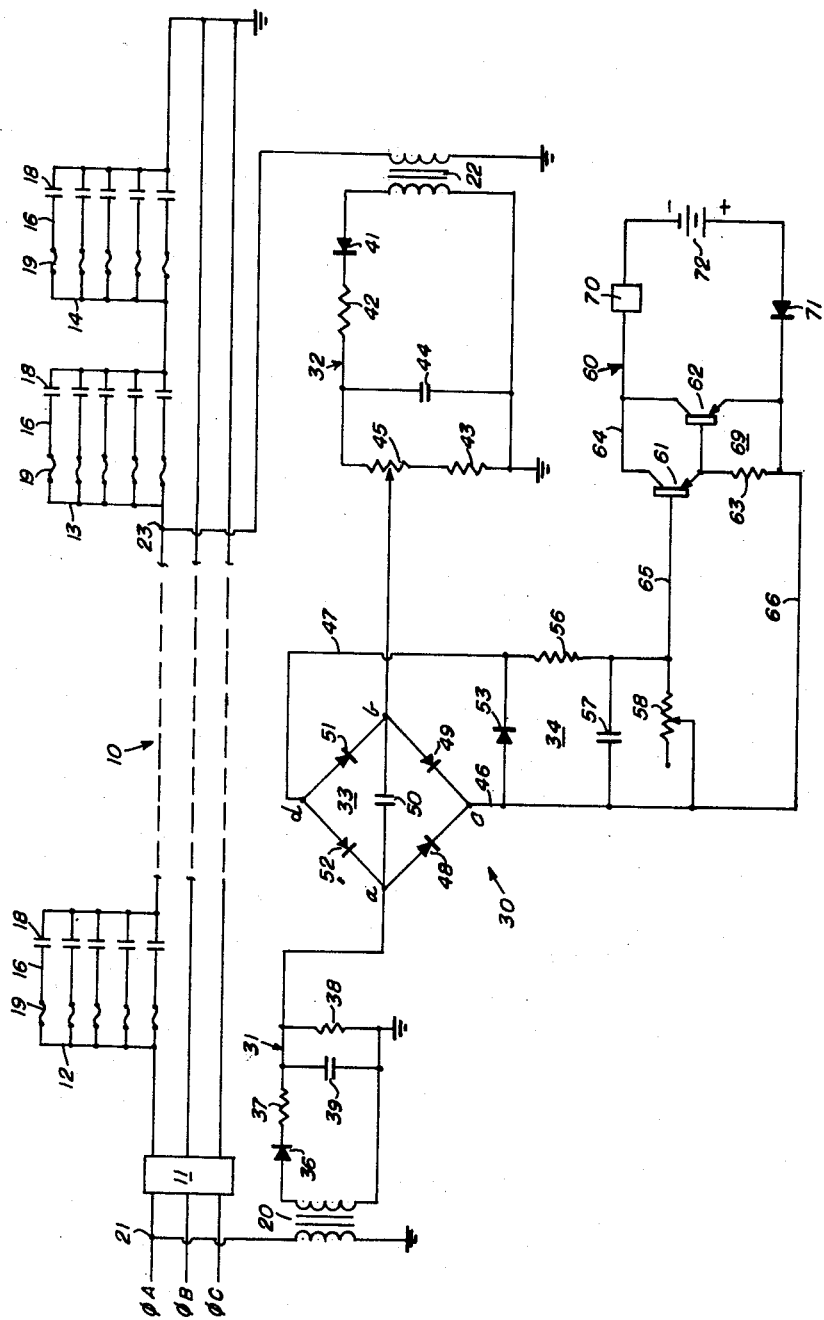

3,181,031
STATIC VOLTAGE DIFFERENTIAL RELAY FOR PROTECTION OF SHUNT CAPACITORS
Moon Tom Yee, 4144 SE. Rural St., Portland, Oreg.
Filed Nov. 1, 1961, Ser. No. 149,473
8 Claims. (Cl. 317—12)
(Granted under Title 35, U.S. Code (1952), sec. 266)

The invention herein described and claimed may be manufactured and used by or for the Government of the United States of America for governmental purposes without the payment of royalties thereon or therefor.

The invention relates to improvements in apparatus for detecting and indicating electrical conditions in high voltage shunt capacitor-banks connected to regulate the voltage of a power transmission system. More particularly, it concerns an alarm or trip relay operation control circuit arrangement sensitive to differences in voltages within a shunt capacitor bank, wherein operation of the relay is indicative of abnormal conditions, such as individual capacitor unit failure and other fault conditions, such as phase to ground faults and phase to phase faults within the capacitor bank. A voltage differential as detected by this operation control circuit, is effective to produce a voltage for activating the indicating relay.

Static shunt capacitors are used in power transmission systems as a means to control the reactive power flow and substation bus voltage. Illustrative of a three phase power transmission system to which the present invention may be applied is a 115-kv. installation having connected to each of its phases a serial arrangement of nine groups of capacitor units, all located within a substation, wherein each group is rated at 7.2 kv., and consists of 15 or more 25-kvar. units in parallel. Another typical installation in which the use of the present invention is desirable is one providing protection for a 230-kv. shunt capacitor installation with a similar layout arrangement as the 115-kv. installation except the number of series group is eighteen. The present invention is added to these installations as part of their over-all protective arrangement including overcurrent relays, a ground relay, a bus time delay overvoltage relay, and fuses. The protective relays normally used, which may be conventional type electro-mechanical devices, do not provide protection against over-voltages resulting from a blown fuse in one of the aforementioned groups of capacitor units. To safeguard against this type of over-voltage, the general practice has been to design an installation with adequate capacitor units in parallel for each serially connected group, so that when a fuse is blown the voltage impressed on the remaining parallel units in the defective group will be less than 110 percent of rated voltage. However, since the system operating voltage is normally higher than the rated capacitor voltage, this practice is not always effective. Therefore, adequate protection would generally call for increasing the numbers of capacitor units in parallel in any particular group since the rise in percentage of over-voltage due to one blown fuse in a group of parallel units, is inversely proportional to the number of capacitor units in parallel. Visual inspection by operating personnel is generally the sole method used at present to detect blown fuses. Consequently, the more convenient, positive, and reliable detection of blown fuses afforded by the utilization of the present invention, allows a more economic design for transmission systems since dependable protection may be achieved with a minimum number of shunt capacitor units of larger sizes.

It is therefore an object of the present invention to provide for the protection of shunt capacitor banks connected to a high voltage power transmission system by providing a relay control circuit which is operatively responsive to relatively small differences in voltages detectable within the capacitor installation.

Another object of the present invention is to provide a sensitive relay circuit controlling either an undervoltage, or an overvoltage, or combined overvoltage and undervoltage relay apparatus.

These and other objects of the invention will be more clearly understood from the following description of a preferred embodiment of the invention.

Referring to the figure of the drawing there is shown a schematic representation of the preferred embodiment of the invention. A conventional three phase bus 10, from a substation having a 230-kv. shunt capacitor bank installation, is indicated in the figure by the three lines designated $\phi A$, $\phi B$, and $\phi C$, with the neutral of the capacitor bank solidly connected to ground. The rated capacitor voltage of this installation is determined to be 224.6 kv. To provide a three phase rating of 40,900 kvar., there are connected in series on each of the phases, eighteen groups of shunt capacitor units. These connections are shown only in part on the A phase of bus 10 having in circuit the first capacitor unit group 12, and the seventeenth and eighteenth similar groups 13 and 14. Each of these groups is shown with only a representative number of shunt capacitors in parallel circuits 16, and each such circuit comprising a capacitor unit 18, and a fuse 19. The conventional circuit breaker 11 is used to energize or deenergize the capacitor bank. Its conventional electro-mechanical protective relays are not shown.

A bus potential transformer 20 at the substation, is connected through its primary winding to ground and to junction 21 in the circuit of the phase A ahead of the first shunt capacitor group 12. A second potential transformer 22, is connected through its primary winding to ground and to junction 23 in the circuit of phase A immediately before the seventeenth shunt capacitor group 13. Transformer 20 is effective to reduce the 133 kv. tapped at point 21, to 115 volts to be made available in its secondary winding as voltage $V_1$. In the same way, transformer 22, reduces the 14.4 kv. from point 23, to make available 120 volts in its secondary winding as voltage $V_2$. Obviously the second potential connection in the circuit of the phase may be made at a point other than before the seventeenth group, so long as the corresponding transformer is appropriately rated.

A control circuit 30, cooperatively related to bus 10 by the secondary windings of transformers 20 and 22, receives for its operation the voltages $V_1$ and $V_2$, and in accordance therewith is effective to control by its output, the operation of a relay power circuit 60. Comprising the control circuit 30 are first and second rectifier-filter circuits 31 and 32, respectively, a time delay circuit 34, a surge control element 53, and a comparer circuit consisting of a surge capacitor 50 and a bridge rectifier 33. In circuit with the secondary of transformer 20, the rectifier-filter circuit 31 includes a silicon diode 36, resistors 37 and 38, and a capacitor 39. Rectifier-filter circuit 32 is similarly composed of the secondary winding supplying $V_2$, silicon diode 41, resistors 42 and 43, a capacitor 44, and in addition a rheostat 45. The latter is operative as part of the rectifier-filter and also functions as a balancing resistor in a manner to be hereinafter explained.

To form the bridge-rectifier circuit 33, four arms thereof are shown in the figure of the drawing as connections between terminals $d$, $a$, $c$, $b$, and $d$, wherein each arm comprises one of the silicon diodes 52, 48, 49, and 51. As applied in the circuit of the present invention, bridge 33 is operative to compare the states of the voltages at terminals $a$ and $b$ connected respectively to the outputs of the rectifier-filter circuits 31 and 32. In order that the output if any, from this comparer circuit be the same one fixed polarity in every case, the diodes of this circuit are connected having their polarities directed accordingly.

The output of delay circuit 34, comprising resistor 56 and capacitor 57, is received across a rheostat 58 which is adjustable to set the voltage level of the output required for activating a device 70 to pick up an alarm relay or trip a breaker. Between the rheostat 58 and device 70, the power circuit 60 comprising a transistor amplifier 69, functions to provide for the operation of the device 70, a current of appropriate magnitude. Amplifier 69 comprises two low energy type germanium PNP transistors 61, 62, having their collectors connected in parallel on line 64 to the load of device 70. The forward bias of the transistors is determined by the input from delay circuit 34 on line 65, 66 through the common emitter biasing circuit including the rheostat 58, and resistor 63. A required collector voltage is provided from a 17 volt direct current source 72, through a silicon diode 71, connected in the collector-emitter circuit of the transistors.

In operation, under normal conditions when no one of the capacitor units 18 is defective, the A.C. voltages $V_1$ and $V_2$, received in the rectifier-filter circuits 31 and 32, are not equal, as previously indicated. As a result, the rectified and filtered potentials received at terminals $a$ and $b$ of the bridge 33, are also the same, unless a balancing resistor 45 is used. After resistor 45 is properly adjusted, the potential at terminal $c$ with respect to terminal $d$ is zero and the bridge is balanced. No current flows through diode 53, and there is no effective output to the amplifier 69 and relay activating device 70. It may also be desirable, in certain cases, to adjust resistor 45 to purposely reduce the effect of $V_2$ so that it will be less than that of $V_1$, to provide an offset. The purpose of offsetting is to increase the sensitivity of the alarm or trip control. It should be recognized that under the previously defined normal conditions, external system faults or changes in bus voltages, will not change the comparer output at the bridge terminals, since input voltages $V_1$ and $V_2$ are caused thereby to fluctuate simultaneously and at approximately the same rates.

The present invention is operative for its intended purpose under abnormal or defective conditions on bus 10, when one or more of the parallel connected capacitor units 18, are taken out of the circuit by blown fuses. To illustrate this operation consider bus 10 to have in each of the eighteen serially connected groups on phase A, a total of 15 capacitor units in separate parallel circuits, each unit being rated at 50 kvar. With one fuse blown in a shunt capacitor circuit of a group, it can be demonstrated by a known procedure of calculations that a 6.7 percent voltage rise will take place across that particular group of parallel capacitors. As a result, each of the remaining seventeen groups will have a one-seventeenth of 6.7 percent voltage decrease, or 0.394 percent decrease. For the circuit arrangement shown in the figure of the drawing, a blown fuse in the seventeenth group, will cause a differential voltage $(V_2-V_1)$, of 6.7−.394 percent or 6.306 percent. This value in terms of direct current differential voltage supplied to the bridge circuit 33, is about 9 volts. However, the forward drop through the pertinent silicon diodes of the bridge circuit limits the output available to the power circuit 60, to about 1.8 volts. With further reference to the drawing, it can be seen that with terminal $b$ being positive with respect to terminal $a$, the current flow will be from $b$ to $a$ through diode 49, a line 46, diode 53, a line 47, and diode 52. In the event a fuse is blown in one of the capacitor units 18 of the first sixteen groups, the differential voltage $(V_1-V_2)$, will be only one-seventeenth of 6.7 percent or 0.39 percent. Under these circumstances, terminal $a$ of the bridge will be positive in respect to terminal $b$, and the current flow will be from $a$ to $b$ through diode 48, line 46, diode 53, line 47, and diode 51. In this instance, the differential voltage is 0.6 volt.

Response curves for relay device 70, based on voltage data measured across the bridge and current data in the relay coil, indicates that a total available voltage of at least +1.2 volts would be required to cause the relay device to be tripped by the output of power circuit 60. It is therefore appropriate in this case that resistor 45 be adjusted to produce an offset of about +0.7 volt measured across the bridge with terminal $a$ positive in respect to terminal $b$, so that there will be a margin of 0.1 volt over and above the minimum pick-up value of 1.2 volts.

As is evident from the previous description of the current paths in the bridge circuit, all voltages sensed between terminals $c$ and $d$ will always have the same fixed polarity. In timing circuit 34, connected across these terminals, the effect of this voltage is delayed by the charging time for capacitor 57 as determined by the impedance of the circuit comprising this capacitor and resistor 56. By means of the delay circuit, transient or random system voltage fluctuations due to switching or external fault conditions may be overridden in the control circuit 30 without it causing the relay device 70 to be activated. However, a potential of suitable magnitude and duration developed in the time delay circuit 34, is effective to energize the rheostat 58 connected in a parallel circuit therewith. Consequently, the circuit comprising the rheostat 58, and resistor 63 becomes effective to appropriately bias the transistor amplifier 69 of the power circuit 60, such that there is energized and made active the relay device 70 connected in line 64 of the amplifier output circuit. A selective adjustment of rheostat 58 is made to establish a definite threshold voltage above which the relay device 70 will be sufficiently powered to operate for tripping a breaker or switching on an alarm, and below which the relay device will not be made operative.

Although the invention is particularly described and illustrated herein, in relation to a defect-indicating means, detecting differential voltages on shunt capacitor banks, it is to be appreciated that the novel circuits disclosed may be used in conjunction with any circuit where it is desired to detect over or undervoltage conditions of voltage equality or inequality. Obvious modifications may be made to the structural elements of the invention without departing from the concept and spirit of the invention. For example, greater sensitivity may be achieved by using silicon transistors having greater temperature tolerance, or rectifiers and other components having higher voltage ratings so that the two sources of A.C. input potential may be raised from 115 volts to 230 volts. The invention is, therefore, intended to cover all such applications, and modifications and variations in the circuit as fall within the scope thereof as defined in the appended claims.

I claim:

1. A multi-phase power transmission system defect indicator control circuit, comprising first and second voltage detector circuits connected to first and second portions respectively, on one phase of the power system having serially connected between and after said portions, groups of capacitor units in parallel circuits for maintaining a balanced reactive load in said transmission system, each said connection between a voltage detector circuit and a portion of the power system phase comprising a voltage transfer means having one end thereof joined to the said portion corresponding thereto, and an opposite end thereof joined to an electrically conductive juncture common to both said voltage transfer means, a comparer bridge circuit, circuit means connecting respective output lines from the first and second voltage detector circuits to opposite input terminals of said comparer bridge circuit, whereby voltages obtained from said voltage transfer means and modified by said voltage detector circuits are transmitted to said opposite input terminals, an indicator activating device, an amplifier circuit having the actuating device in its output circuit and operable to cause said device to function, and other circuit means comprising an adjustable means connected to the input of the amplifier and to other opposite output terminals of said comparer bridge circuit whereby the latter means is operable to determine a voltage from the output terminals of the comparer bridge circuit below which the amplifier is ineffective to cause the device to function.

2. A control circuit of claim 1, and said comparer bridge circuit consisting of a surge capacitor and a bridge circuit having connected together at each of its terminals a pair of arms, each arm having in circuit a silicon diode, wherein the low resistance paths through said diodes are directed to allow current to flow both towards and away from the input terminals of said bridge circuit.

3. A control circuit of claim 1, wherein the voltages received in said voltage detector circuits from said portions of the one phase of the power system are alternating current voltages, and each said voltage detector circuit having elements therein to rectify and filter said detected voltage to provide at its output lines a substantially ripple-free direct current voltage for input to said comparer bridge circuit.

4. A control circuit of claim 1 having a rectifier means connected across the said output terminals of the bridge circuit, and the said other circuit means also comprising time delay circuitry connected across said rectifier means and said adjustable means connected to the input of the amplifier.

5. A control circuit of claim 1, wherein said amplifier circuit comprises two transistors having biasing base-emitter circuits connected across said adjustable means to receive said output from the other circuit means, and having the said activating device in their collector-emitter output circuits.

6. A control circuit of claim 1, wherein the voltages received in said voltage detector circuits from said portions of the one phase of the power system are alternating current voltages, said first voltage detector circuit comprising means to rectify and filter said voltage from said first portion, and said second voltage detector circuit comprising means to rectify, filter and modify by offsetting the magnitude of the voltage from said second portion.

7. A multi-phase alternating-current power transmission system defect indicator control circuit, comprising separate voltage detector circuits, further circuits comprising voltage transfer elements, joining in parallel connections said voltage detector circuits to first and second portions respectively, on one phase of the power system having serially connected between and after said portions, groups of capacitors in parallel circuits for maintaining a balanced reactive load in said power transmission system, a bridge circuit, means in each said detector circuits to rectify and filter the voltage supplied thereto by the said voltage transfer element joined to one of the respective portions to produce a direct current voltage, and to supply the latter to one of the opposing input terminals of said bridge circuit, an indicator activating device, an amplifier circuit having the activating device in its output circuit and operable to cause said device to function, and circuit means connected to the input of the amplifier and to other opposite output terminals of said bridge circuit whereby differential current flowing in said bridge circuit is received in the amplifier to cause it to be effective to energize the activating device.

8. A multi-phase alternating-current power transmission system defect indicator control circuit, comprising separate voltage detector circuits, further circuits including voltage transformer elements joining in parallel connections said voltage detector circuits to first and second portions respectively, on one phase of the power system having serially connected between and after said portions, groups of capacitors in parallel circuits for maintaining a balanced reactive load in said power transmission system, a bridge circuit comprising arms connected in pairs at opposing input and output terminal points, a rectifying device in each arm providing a current path towards and away from each of the opposing input terminals of said bridge circuit, circuit means connecting the respective outputs from the said separate detector circuits to respective ones of the opposing input terminals of said bridge circuit, an indicator activating device, an amplifier circuit having the activating device in its output circuit and operable to cause said device to function, and other circuit means connected to the input of the amplifier and to the opposing output terminals of said bridge circuit whereby differential current flowing in said bridge circuit is received as a fixed polarity direct current in the amplifier to cause it to be effective to energize the activating device.

References Cited by the Examiner

UNITED STATES PATENTS

| | | | |
|---|---|---|---|
| 2,931,950 | 4/60 | Minder | 317—12 |
| 2,933,652 | 4/60 | Cuttino | 317—27 X |
| 3,048,744 | 8/62 | Warrington | 317—27 |
| 3,054,991 | 9/62 | Howell | 340—251 |

SAMUEL BERNSTEIN, *Primary Examiner.*